United States Patent [19]

Badger

[11] Patent Number: 4,528,079

[45] Date of Patent: Jul. 9, 1985

[54] METHOD OF MITIGATING BOUNDARY FRICTION AND WEAR IN METAL SURFACES IN SLIDING CONTACTS

[75] Inventor: Philip O. Badger, South Bend, Ind.

[73] Assignee: Miracle Metals, Inc., Denver, Colo.

[21] Appl. No.: 497,890

[22] Filed: May 25, 1983

[51] Int. Cl.³ .................. C25F 3/00; B21D 53/10; F16C 13/00; B21B 45/02

[52] U.S. Cl. ................... 204/129.1; 204/129.46; 204/129.75; 29/149.5 PM; 29/149.5 NM; 384/293; 72/41

[58] Field of Search .......... 204/129.46, 129.1, 129.75; 29/149.5 R, 149.5 PM, 149.5 NM; 72/41; 308/5 R, 240, 241; 384/291, 292, 293

[56] References Cited

U.S. PATENT DOCUMENTS

| | | | |
|---|---|---|---|
| 886,349 | 5/1908 | Connell | 148/4 |
| 936,389 | 10/1909 | Wadsworth | 427/360 |
| 1,581,394 | 4/1926 | Dann | 29/149.5 R |
| 1,964,671 | 6/1934 | Nesbitt | 29/149.5 PM |
| 2,490,548 | 12/1949 | Schultz | 29/149.5 R X |
| 3,075,279 | 1/1963 | Haltner et al. | 29/149.5 PM X |
| 3,127,224 | 3/1964 | Owens et al. | 29/149.5 PM |
| 3,882,584 | 5/1975 | Tsuya | 308/5 R X |
| 4,125,637 | 11/1978 | Tanner | 29/149.5 NM X |
| 4,204,886 | 5/1980 | Bens | 148/15.5 |
| 4,204,924 | 5/1980 | Harlfinger et al. | 204/129.35 |
| 4,312,900 | 1/1982 | Simpson | 427/181 |

OTHER PUBLICATIONS

Winer, W. O., "Molybdenum Disulfide as a Lubricant; A Review of the Fundamental Knowledge", Reprinted from Wear, 10 (1967), 422–452.

*Primary Examiner*—Donald R. Valentine
*Attorney, Agent, or Firm*—Simmons, Perrine, Albright & Ellwood

[57] ABSTRACT

A method of treating the surface of a metal sliding contact which involves the immersion of the metal contact in an acid bath, in the presence of an electrolytic current to produce pockets bounded by crystalline projections. A lubricant is applied to the contact to fill the pockets therein and the crystalline projections are bent over to trap the lubricant.

10 Claims, No Drawings

METHOD OF MITIGATING BOUNDARY FRICTION AND WEAR IN METAL SURFACES IN SLIDING CONTACTS

FIELD OF THE INVENTION

This invention relates to a method of forming a metal surface which mitigates friction and wear present when the surface is brought into sliding engagement with a second metal surface.

BACKGROUND OF THE INVENTION

Relative velocity between metal surfaces in sliding contacts must occur at slow speeds in loaded conditions in order to produce hydrodynamic lubrication boundary conditions. Boundary conditions are also pervasive when starting and stopping machinery, as for example, in an automotive vehicle. It is well known to the student of tribology that when metal surfaces are in reciprocating modes of sliding contacts, as in the piston and cylinder of an internal combustion engine, friction and wear are most severe at top dead center (TDC) and bottom dead center (BDC) of the stroke positions of the piston. At these exact points where the piston changes direction, a condition of zero velocity occurs causing metal contact.

This condition is most severe at TDC because lubricating oil on the surface thereof is exposed to combustion temperatures causing unfavorable changes in its viscosity. This condition renders it more difficult to retain oil in the pores of the metal surfaces, accelerating the diminishment rate subsequent to when the liner is wiped clean by the oil wipe rings situated beneath the combustion rings of the piston. In the past, cylinder surfaces have been honed producing a cross-hatching effect, or shot blasted in order to increase the retention rates of the oil film on the surface. These techniques have met with only marginal success because of the combination of operating conditions above described. Also, in hydraulic cylinders, boundary conditions occur for some of the same reasons previously described. The traversing speed of the piston within the cylinder is insufficient in terms of relative velocity to produce an oil film thickness necessary to prevent metal to metal contact, thereby making the presence of boundary conditions unavoidable.

Surface bonded films of solid lubricants on many metal substrates have been evaluated on applications where operating conditions cause friction and wear. This was done in order to improve the performance standards in terms of mechanical failure prevention caused by sliding contact of unseparated surfaces. If surfaces contact, this condition in the presence of a lubricating material is known as a "mixed friction condition." When this situation occurs, the surface coating of the solid lubricant will alter the friction characteristics. However, research has clearly demonstrated that when operating conditions are such to cause boundary conditions to prevail, the surface film of the lubricant is diminished rapidly. The removal of the film in some instances is caused by sliding contacts in conformal modes of contact.

In counterconformal modes of sliding contacts, a molybdenum disulfide ($MoS_2$) surface coating in a hydrodynamic environment where operating conditions cause boundary contact was observed. The hydraulic forces in the oil wedge that accumulates at a point adjacent the position of line contact causes the oil to infiltrate the relatively porous structure of the surface coating causing the removal of the film to become accelerated by the mechanism of cavitation. Consequently, the solid lubricant provides only intial benefits when used and does nothing to mitigate friction and wear once it becomes removed from the surface.

Pursuant to the art of improving the retention rate levels of a solid lubricant surface coating on a metal surface, many techniques have been used upon the metal surfaces prior to the application of solid lubricant surface coating. Included among these processes are phospatizing, etching, shot peening or shot blasting, vapor blasting and carbo-nitriding. These processes are designed to irregularize the surface of the metal, creating pits or micro-reservoirs into which the lubricant surface coating can be deposited. Regardless of which method is used, the coating applied is still a surface coating and is removed from the surface by the onset of boundary conditions. Also, shot peening or shotblasting subjects the surface to relatively high amounts of compressive and residual stress. A study at the John Deere Product Engineering Center in Waterloo, Iowa, clearly underscored this fact on an oil pump gear. A $MoS_2$ surface coating was applied to an alloyed steel surface after the gear had been case hardened by means of carbo-nitriding. During a 500 hour comparative wear test, it was observed that the surface film of the solid lubricant was completely removed from the alloyed steel surface after only 43 hours.

In recent research done at the Engineering Research Institute, located on the campus of Iowa State University at Ames, Iowa, it was observed that in a counterconformal mode of sliding contact during the production of boundary conditions, the combination of oil and $MoS_2$ surface coating caused the surface coating to become abrasive in situ. This abrasiveness caused metal removal to become accelerated from the underlying substrate. This phenomena is in certain aspects puzzling and not completely understood. It has been postulated that it could be caused by the anisotropic crystal structure of $MoS_2$. Because the $MoS_2$ has a lattice layer-type structure, the bonds on the basal plane are long and possess a low lamellar shear strength which shear easily on sliding contact. However, in the crystal planes perpendicular to the basal plane, the bonds are much shorter and therefore many times stronger. Recent studies have shown these differences in strength between bonds in the $MoS_2$ crystal to be on the order of magnitude of 29.

It is thus clear that some method must be devised to increase the endurance life of a solid lubricant used in operating conditions within a hydrodynamic environment causing boundary conditions. Benefits accruing by increased mitigation of friction and wear in terms of the life of the parts would lead to the production of more efficient and economical machines which utilize sliding contacts.

SUMMARY OF THE INVENTION

The method of this invention serves to sufficiently mitigate boundary friction and wear in sliding surface contacts which utilize a solid lubricant in a hydrodynamic environment. The bearing surface of a material is first treated to produce long ferritic crystalline projections, having pockets formed between the projections which act as potential reservoirs for a solid lubricant. The solid lubricant is then applied to the surface to fill the surface pockets of the material. The ferritic crystalline projections are bent over the surface pockets to trap the lubricant within the pockets. The resulting surface material efficiently houses the solid lubricant during periods of boundary operating conditions. Such surface is thus more durable, requires less maintenance and provides a more efficient working part.

Accordingly, it is an object of this invention to provide a method for mitigating boundary friction and wear in sliding metal contacts.

Another object of this invention is to provide for a method of forming metal surfaces which effectively house a solid lubricant.

Another object of this invention is to provide for a method of forming a metal surface which is efficient and economical.

Still another object of this invention is to provide for a method of producing more reliable and efficient parts for internal combustion engines.

Other objects of this invention will become apparent upon a reading of the following description.

DESCRIPTION OF THE PREFERRED EMBODIMENT

The preferred method herein described is not intended to be exhaustive or to limit the method to the precise steps disclosed. It is chosen and described to best explain the principles of the invention, and its application and practical use to thereby enable others skilled in the art to utilize the method.

The method of this invention may be utilized on any type of metal surface which may be subjected to sliding motion relative to a second metal surface. A typical example of such a metal surface would be a cylinder sleeve for an internal combustion engine.

Cylinder sleeves for internal combustion engines are generally manufactured from centrifically spun cast iron. Typically, the bores of these sleeves are machined to size and then cross hatched by honing. Also, castings of this nature have been produced from a material called meehanite, which is characterized by a consistently uniform grain structure.

In the treatment of cylinder sleeves, the method of this invention involves machining the internal bore of the cylinder sleeve approximately 0.0008 inches under size. The cylinder is then immersed and soaked in a bath of a strong acid, preferably about 10% by weight HCl or $H_2SO_4$, for about 15 minutes. The temperature of the bath is preferably maintained at a range of between 140°–160° F. During the immersion period, an electrolytic current of approximately 40 amps is transmitted through the bath from the direction of the positive pole to the negative pole of the bath.

As the current traverses throughout the bath, the metal from the surface of the cylinder is removed quite rapidly. The current traveling from the positive pole to the negative pole acts as a catalyst, increasing anionic activity within the bath, enabling the iron present in the cylinder to reduce itself to a divalent state. When so reduced, the resulting $Fe^{+2}$ ions enter the solution. The resulting cylinder surface exhibits long ferritic crystalline projections. Between these projections are pockets within the surface that are potential reservoirs for a solid lubricant to be stored after its application. After approximately 15 minutes of immersion within the acid bath, these pockets are on the order of 0.0006–0.0008 inches below the tops of the ferritic crystal projections, permitting an ideal surface condition for the subsequent application of the solid lubricant.

With reference to metal surfaces in general, the electrolytic or reversing of current in an acid bath indicates the direction of DC current flow in which metal ions tend to flow away from the workpiece and toward the anode. The anode is negatively charged and the workpiece or surface positively charged. The amount of material removed is a function of acid concentration, exposure time in the bath, and the total amount of surface area on the workpiece in combination with amp hours. What appears to be the most practical for partial removal of 0.0006–0.0008 inches of surface ferrite is 0.013 ampere-hours per square inch of workpiece area, with current and exposure time being variable.

After the acid treatment has been completed, it is necessary to rinse the piece or sleeve in the described example to remove residual acid from the piece surfaces. The rinsing process is rapidly followed by a 30 minute thermal treatment at approximately 350° F., to avoid hydrogen embrittlement of the surface metals. The solid lubricant surface coating is then applied to the piece to fill the acid formed pockets in the piece surface between ferritic crystalline projections.

The solid lubricant is best applied by spraying, which allows the precise controlling of the thickness of the surface film. Since $MoS_2$ surface films are solids in suspension with a common solvent, care must be taken to keep the material being sprayed under constant agitation. This allows for a uniform deposition of lubricant on the surface of the metal. Any conventional organic or inorganic binder, such as sodium silicate, may be used with the $MoS_2$ films, the latter being preferred for operating temperatures up to 800° F.

An effective combination solid lubricant includes $MoS_2$ combined with antimony thioantimonate ($SbSbS_4$). This additive exhibits superior load carrying capacities in sliding metal contacts than unadulterated $MoS_2$. A 3–5% by weight addition of $SbSbS_4$ to the $MoS_2$ suspension yields excellent results. $SbSbS_4$ exhibits a complex chalcogenide property and is benign and therefore suitable for use as a lubricant.

After the solid lubricant coating has been applied to the highly irregularized metal piece surface, mechanical inclusion of the lubricant into the micro-structure of the metal is facilitated. A preferred method for such mechanical inclusion is by controlled rubbing of the piece surface, such as by precision controlled roller power burnishing. In this procedure, the part being manufactured is placed in a stationary chuck, allowing the burnishing tool to traverse its internal diameter. The protruding asperities or ferritic crystalline projections on the surface are then bent over during the burnishing step to cause trapping of the lubricant particles in the adjacent pockets produced by the acid bath step. The technique that works well with ductile materials is to regulate the air pressure which is connected to the burnishing tool. Initially the pressure is kept at a low level, so that the pressure exerted from the rools upon the contacting metal asperities is above their yield point, but below the metal's elastic limit. For example, upon the initial pass on a cylinder having a 3½ inch bore diameter, the initial pressure was 15 psi and gradually increased to 40 psi on subsequent passes. Satisfactory asperity manipulation was observed during this procedure. When using other type materials, such as cold drawn steel tubing (AISI C 1035-AISI C1078) or type 300 series stainless steel cold drawn tubes, the burnishing pressure must be adjusted accordingly owing to the differences in the various metal yield points and ultimate strengths. When the yield point of the metal is close to the elastic limit of the metal, the burnishing pressure must be carefully controlled and incrementally increased.

Having thus described the process which is my invention, the following examples are offered as specific tests of its effectiveness:

EXAMPLE 1

In the first test, several $3\frac{1}{2}$ inch diameter sleeves of cast iron were fabricated as follows: the bores of the cylinders were first machined to 0.0008 inches undersize; the cylinders were then immersed for 15 minutes in an acid bath of 10% $H_2SO_4$ at a temperature which ranged from 140°–160° F. Simultaneously, during the immersion process a current of 40 amps was passed through the bath. The specimen was then rinsed with water and heated to 350° F. for 30 minutes. After cooling, a lubricant containing $MoS_2$ and 3% $SbSbS_4$ was then sprayed onto the inner surface of the bore. The cylinders were then placed in a stationary chuck and a power burnishing roller applied to the lubrican coated surface. The initial pressure of the roller applied to the bore was 15 psi and was gradually increased to 40 psi after 20 passes across the cooled surface. A specimen was then cut from the sleeve and mounted in an epoxy mold suitable for microscopic examination. Extreme care was taken when polishing the specimen for examination so that rounding of the edges was avoided. The specimen was then examined in a metallurgical microscope at 1000× with incident light. Examination of the specimen revealed numerous inclusions of the lubricant embedded in the surface of the material.

EXAMPLE 2

In a second test, specimens were prepared according to the method of Example 1. The specimens were then attached to a block beneath a pair of strain gauges held within a rod acting as a vertical support arm. A hardened tool steel disc (AISI 4340 $R_c$ 59) situated beneath and in contact with the specimen was then rotated at 100 rpm's, allowing the PV value to reach 80,000, thus assuring boundary operating conditions. The friction was then measured by means of the strain gauges loaded by differential bending of the vertical support arm. The signal was amplified and recorded on a Brush Mark 220 strip chart recorder. Typical traces of kinetic friction under operating conditions assuring boundary contact were significantly lower than when compared to results recorded on an untreated surface.

It is to be understood that the invention is not to be limited to the scope of the above given details, and that it may be modified within the scope of the appended claims.

What I claim is:

1. A method of forming a metal contact surface for sliding engagement with another surface, said method comprising:
   (a) treating said metal surface to form a plurality of metallic crystalline projections thereon with the areas between said projections penetrating the substrate of said metal surface and constituting reservoir means therein for containing a solid lubricant;
   (b) applying a solid lubricant to the resulting treated surface to fill said reservoir means; and
   (c) causing said crystalline projections to be bent over said reservoirs to entrap said sold lubricant within the reservoirs by applying gradually increasing pressure on said metal surface so that said crystalline projections are bent relative to the remainder of said metal surface.

2. The method of claim 1 wherein step (c) includes burnishing said treated surface.

3. The method of claim 1 wherein step (b) includes applying a solid lubricant which consists essentially of $MoS_2$ and $SbSbS_4$.

4. The method of claim 3 wherein the amount of $SbSbS_4$ ranges from 3–5% by weight.

5. The method of claim 1 wherein step (a) includes immersing said metal surface in a bath of a strong acid while simultaneously passing an electrolytic current through said bath.

6. The method of claim 5 wherein said strong acid consists essentially of $H_2SO_4$.

7. The method of claim 5 wherein said strong acid consists essentially of HCl.

8. The method of claim 6 wherein the total concentration by weight of said acid does not exceed 10%.

9. The method of claim 7 wherein the total concentration by weight of said acid does not exceed 10%.

10. The method of claim 5 wherein the magnitude of said current is approximately 40 amperes.

* * * * *